3,031,511
GLYCOL DIETHER INHIBITORS
Robert J. Zellner, Marinette, Wis., and Charles A. R. Johnson, Menominee, Mich., assignors to Ansul Chemical Company, Marinette, Wis., a corporation of Wisconsin
No Drawing. Filed Oct. 30, 1959, Ser. No. 849,710
8 Claims. (Cl. 260—611.5)

This invention relates to the protection of glycol diethers against decomposition using heterocyclic nitrogen compounds as stabilizers.

Glycols and their ethers tend to decompose on heating or on prolonged storage or exposure to air, forming acids and other active hydrogen compounds including water. These decomposition products tend to build up or accumulate even when the ethers are stored under nitrogen, indicating that the reaction mechanism may be one of auto-oxidation. This is a serious problem since these glycol ethers are used as reaction media for such reagents as Grignards, metallic sodium and metal hydrides, which react with these decomposition products and active hydrogen compounds.

It is an object of this invention to provide a practical and highly effective method for substantially reducing the formation of these decomposition products. It is a further object of this invention to provide an inhibitor which will protect the ether in the vapor phase as well as the liquid phase. It is a still further object of this invention to provide an inhibitor which is not easily separated from the ether by distillation when such separation is not desired. It is a still further object of this invention to provide inhibitors which are relatively inert to metallic sodium. It is an additional object of this invention to provide inhibitors which can be distilled at ordinary pressures without decomposition. Glycol diethers of the formula $RO(CH_2CH_2O)_nR'$, where R and R' are alkyl groups having 1 to 4 carbon atoms and $n$ is a number from one to four, are used as inert reaction media for such reactions as the Grignard reaction and sodium condensations and in other places where it is desirable to have a dry medium of good solvent power. For these uses the phenolic type inhibitors, such as disclosed in U.S. Patent 2,114,832 cannot be used since they react with the reagents to give undesirable products. The amine type compounds which are disclosed as inhibitors in U.S. Patents 2,132,017 and 2,044,800 have boiling points which are frequently widely divergent from the boiling point of the ether which they are intended to protect. Thus, these inhibitors do not inhibit the ether in the vapor phase, and when the ether is recovered by distillation the inhibitor is removed.

Since the glycol ethers have boiling points which vary with their molecular weight, it is necessary to supply inhibitors having a range of boiling points. For example, dimethoxy diethylene glycol boils about 162° C. and can be suitably inhibited with N-butylene pyrrole which boils at 155° C. Dimethoxy tetraethylene glycol boils at 275° C. and can be suitably inhibited with 3,5-dibutyl pyridine which boils at 271° C. The very narrow spread between the boiling point of the ether and its inhibitor insures that except by the most efficient fractionation they will not become separated during recovery operations. It is also obvious, however, that if it is desired to remove the inhibitor, it can be accomplished by reversing the inhibitor ether combination, that is, for example, inhibiting dimethoxy diethylene glycol with 3,5-dibutyl pyridine.

A few ethers and an appropriate inhibitor for each are listed in Table I below.

TABLE I
*Ethers and Their Inhibitors*

| Ethers: | Boiling point, °C. |
|---|---|
| Ethylene glycol dimethyl ether | 85 |
| Diethylene glycol dimethyl ether | 162 |
| Triethylene glycol dimethyl ether | 216 |
| Tetraethylene glycol dimethyl ether | 275 |
| Inhibitor: | |
| N-methyl pyrrolidine | 78–80 |
| N-butylene pyrrole | 155 |
| N-hexyl pyrrolidine | 201 |
| 3,5-dibutyl pyridine | 271 |

Homologs of the inhibitors enumerated in Table I also are effective inhibitors and may be used to inhibit homologs of the ethers.

The inhibitors are readily soluble in the ethers and there is no special problem involved in adding the inhibitors beyond agitating to insure dispersion.

When glycol diethers such as diethylene glycol dimethyl ether are stored for a prolonged period of time, even under nitrogen and in the dark, they gradually build up active hydrogen impurities and water. The active hydrogen impurities can be determined by the Zerewitinoff procedure and the water can be determined by the Karl Fisher method. We have also determined that the amount of decomposition which takes place in diethylene glycol dimethyl ether under normal storage at room temperature over a period of 24 months can be approximated by refluxing the ether in the presence of air for 100 hours. A comparison of our heterocyclic compounds with compounds suggested by the prior art is shown in Table II, the last three compounds.

A sample of diethylene glycol dimethyl ether was inhibited with 0.5% N-butylene pyrrole and 0.5% 3,5-dibutyl pyridine which produced results comparable to those obtained with 1.0% of either compound used alone.

Some of the tests were repeated with the inhibitor at a concentration of 0.1%. The ether containing inhibitor at this level showed less buildup of active hydrogen impurities than the uninhibited control sample as shown in the following Table II, but the results were less reproduceable. More than 1% inhibitor may be used, but since it is the desirable solvent properties of the ethers which determine their use in a reaction, and not those of the inhibitor, there seems to be little advantage in adding more inhibitor than is necessary.

TABLE II
[Diethylene glycol dimethyl ether at 160° C.—100 hours]

| Inhibitor | Inhibitor Concentration, Weight percent | Impurities at Start | | Impurities at Finish | |
|---|---|---|---|---|---|
| | | $H_2O$, percent | Active Hydrogen calculated as —OH, percent | $H_2O$, percent | Active Hydrogen calculated as —OH, percent |
| None | | 0.115 | 0.39 | 0.149 | 1.12 |
| 3,5-Dibutyl pyridine | 1 | 0.092 | 0.36 | 0.036 | 0.45 |
| | 0.1 | | 0.33 | | 0.77 |
| Pyridine | 1 | | 0.12 | | 0.36 |
| N-butylene pyrrole | 1 | 0.102 | 0.39 | 0.043 | 0.42 |
| | 0.1 | | 0.25 | | .92 |
| N-hexylpyrrolidine | 1 | | 0.21 | | 0.34 |
| N-methyl pyrrolidine | 1 | | 0.43 | | 0.64 |
| N-methyl pyrrole | 1 | | 0.35 | | 0.52 |
| | 0.1 | | 0.34 | | 0.92 |
| Dibutyl amine | 1 | 0.085 | 0.30 | 0.232 | 0.65 |
| Dihexyl amine | 1 | 0.083 | 0.19 | 0.248 | 0.57 |
| Hydroxy anisole | 1 | 0.072 | 0.19 | 0.178 | 0.55 |

A second test procedure was developed in which the glycol ethers were heated in cylinders of either glass or steel at a temperature of 230–260 C. Prior to filling, the cylinders were evacuated to less than 0.01 mm. of mercury and the increase in pressure within the cylinder on heating was measured as an indication of the extent of decomposition which occurred. The results obtained with several inhibitors are indicated in the following Table III. From these data it will be readily observed that 3,5-dibutyl pyridine is not only a good inhibitor, but is superior to many compounds usually employed for this purpose.

TABLE III

[Tetraethylene glycol dimethyl ether at 450° F.—24 hours]

| Inhibitor | Pressure Rise | |
|---|---|---|
| None | 15.6 | 20.4 |
| Diphenyl amine, 1% | 32.4 | 24.9 |
| N-amino propyl morpholine, 1% | 15.4 | 15.4 |
| Dodecyl amine, 1% | 22.6 | 19.2 |
| 3,5-Dibutyl pyridine, 1% | 8.3 | 8.9 |

From the foregoing description, it will be apparent that a variety of different compositions may be utilized in practicing the present invention. It is to be understood that the foregoing specific compositions should be considered merely as illustrative embodiments of the present invention and that modifications and changes may be made which are intended to be included within the scope of the appended claims.

We claim:

1. A glycol diether having the formula $$RO(CH_2CH_2O)_nR'$$

where R and R' are alkyl groups having 1 to 4 carbon atoms and $n$ is a number from 1 to 4, containing as an inhibitor at least about 0.1% by weight of a heterocyclic nitrogen compound selected from the group consisting of N-methyl pyrrolidine, N-butylene pyrrole, N-hexyl pyrrolidine, 3,5-dibutyl pyridine, N-methyl pyrrole and mixtures of the foregoing.

2. A glycol diether having the formula $$RO(CH_2CH_2O)_nR'$$

where R and R' are alkyl groups having 1 to 4 carbon atoms and $n$ is a number from 1 to 4, containing as an inhibitor at least about 0.1% by weight of a N-butylene pyrrole.

3. Ethylene glycol dimethyl ether inhibited with at least about 0.1% by weight N-methyl pyrrolidine.

4. Diethylene glycol dimethyl ether inhibited by at least about 0.1% by weight N-butylene pyrrole.

5. Triethylene glycol dimethyl ether inhibited by at least about 0.1% by weight N-hexyl pyrrolidine.

6. Tetraethylene glycol dimethyl ether inhibited by at least about 0.1% by weight 3,5-dibutyl pyridine.

7. The method of inhibiting decomposition of a glycol diether having the formula $RO(CH_2CH_2O)_nR'$, where R and R' are alkyl groups having one to four carbon atoms and $n$ is a number from 1 to 4, which comprises dissolving in said ether from about one to ten parts by weight of a heterocyclic nitrogen compound selected from the group consisting of N-methyl pyrrolidine, N-butylene pyrrole, N-hexyl pyrrolidine, 3,5-dibutyl pyridine, N-methyl pyrrole and mixtures of the foregoing to approximately 1000 parts by weight of said ether.

8. The method of inhibiting decomposition of a glycol diether having the formula $RO(CH_2CH_2O)_nR'$, where R and R' are alkyl groups having 1 to 4 carbon atoms and $n$ is a number from 1 to 4, which comprises dissolving in said ether at least about 0.1% by weight N-butylene pyrrole.

References Cited in the file of this patent

UNITED STATES PATENTS

| 2,476,554 | Lincoln et al. | July 19, 1949 |
| 2,736,709 | Glickman et al. | Feb. 28, 1956 |
| 2,936,290 | Gysling et al. | May 10, 1960 |